June 23, 1936.　　　　G. J. THOMAS　　　　2,044,958
BRAKE MECHANISM
Filed Nov. 14, 1932
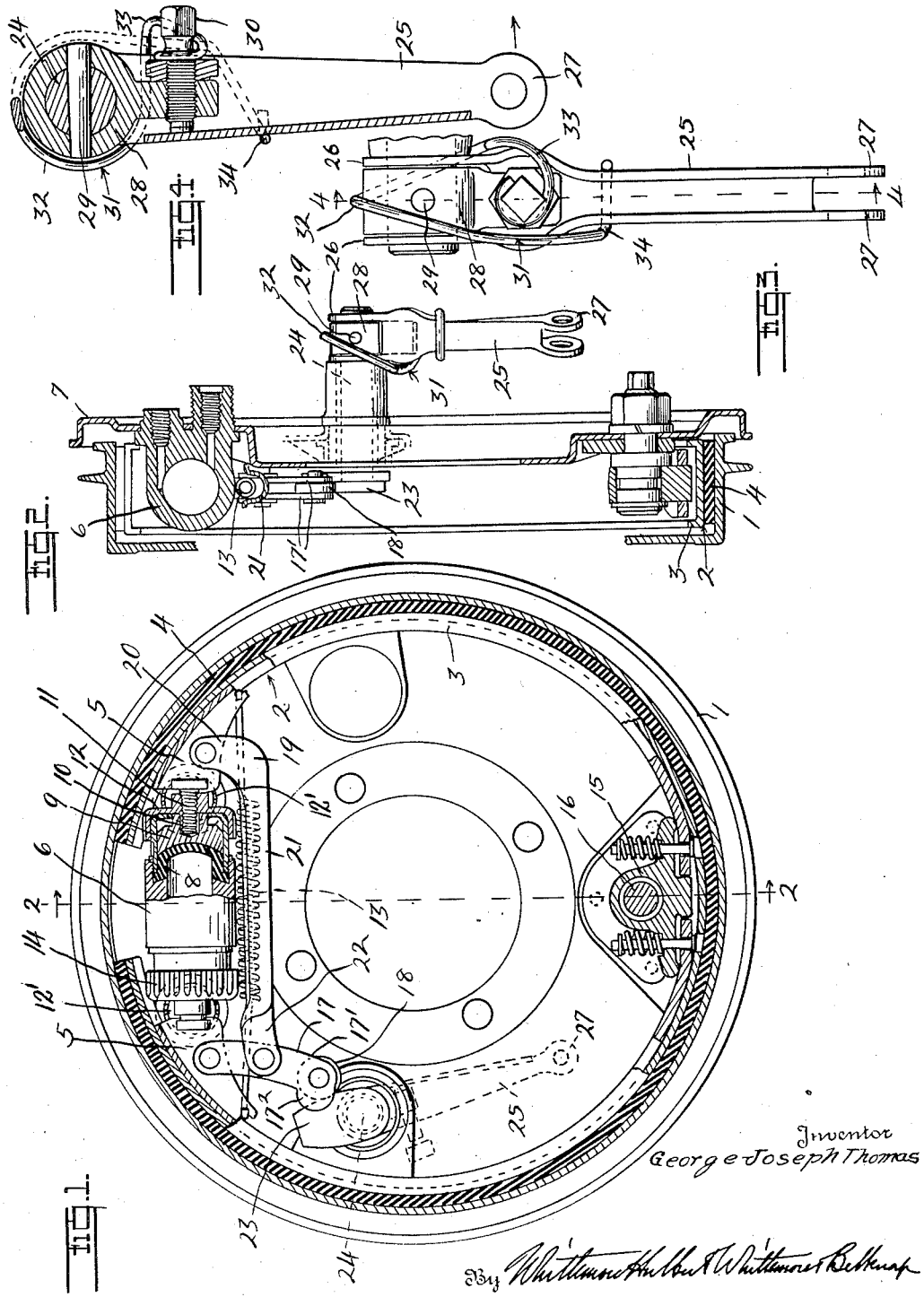
Inventor
George Joseph Thomas Patented June 23, 1936

2,044,958

UNITED STATES PATENT OFFICE 2,044,958

BRAKE MECHANISM

George Joseph Thomas, Birmingham, Mich.

Application November 14, 1932, Serial No. 642,674

7 Claims. (Cl. 188—106)

The invention relates to brake mechanisms and refers more particularly to brake mechanisms of the internal type. One of the objects of the invention is to provide an improved construction comprising a brake friction means engageable with a brake drum and adapted to be forced thereagainst by two separate systems. Another object is to provide an improved and compact arrangement within the brake drum of the devices for forcing the brake friction means against the brake drum.

These and other objects of the invention will become apparent from the following description, taken in connection with the accompanying drawing, in which Figure 1 is a sectional elevation of a brake mechanism showing an embodiment of my invention;

Figure 2 is a cross section on the line 2—2 of Figure 1;

Figure 3 is a detail;

Figure 4 is a cross section on the line 4—4 of Figure 3.

The brake mechanism embodying my invention is designed particularly for use in motor vehicles and has the brake drum 1 which is adapted to be secured to one of the motor vehicle wheels and the brake friction means 2 within the brake drum and comprising, in the present instance, the transversely split flexible band 3 having the lining 4 engageable with the brake flange of the drum. Secured to the inner face of the band at its ends are the brackets 5 which serve as abutments for spreading the ends of the brake friction means apart or urging these ends toward each other.

6 is a support secured to the backing plate 7, which closes the brake drum, and located between the brackets 5. This support is, in the present instance, a cylinder within which are clamped the diaphragms 8 which, together with the cylinder, form a sack for receiving fluid under pressure. Outwardly beyond each diaphragm is a plunger 9 which at its outer end is provided with the axial recess 10 into which freely extends the externally threaded member or screw 11. The outer end of this screw is bifurcated to embrace the adjacent bracket 5 and threaded upon the screw is the nut 12 which is adapted to abut the outer end of the adjacent plunger 9. The nut 12 is cup-shaped and has an annular portion freely encircling the adjacent end portion of the cylinder. The outer face of this annular portion is formed with the longitudinally extending flutes 14. With this arrangement it will be seen that upon subjecting the diaphragms to fluid under pressure the plungers will be forced outwardly and away from each other to in turn force the screws outwardly and away from each other through the nuts upon these screws, these nuts being free to move relative to the cylinder thereby forcing the ends of the brake friction means into engagement with the brake flange of the drum to apply the brake friction means. For urging the ends of the brake friction means toward each other and maintaining the brackets 5 in contact with the screws 11, I have provided the coil spring 13 which has its ends hooked over the brackets 5 and which extends substantially parallel to the support 6 and is located radially inwardly therefrom. This coil spring also serves to retain the nuts 12 in their rotative positions of adjustment by engaging the flutes 14 formed in the outer faces of these nuts and extending longitudinally thereof. As shown in the present instance, the nuts 12 may be each rotatively adjusted by the gear member 12' which is mounted upon the backing plate 7 and the teeth of which slidably engage the flutes 14, this arrangement providing for securing predetermined clearance between the brake friction means and the brake flange of the drum when the brake friction means is in retracted position. Furthermore, this arrangement permits the reciprocation of each nut during the operation of the brake friction means.

As shown in the present instance, the central portion of the brake friction means upon spreading apart of its ends is urged against the brake flange of the drum by the rockable member 15, which is pivoted at 16 to the backing plate 7 diametrically opposite the split in the brake friction means.

17 is a lever pivoted at one end to one of the brackets 5 and depending therefrom and having at its lower end the abutment member 18 which is in the nature of a roll. This lever 17 is preferably formed of two plates 17' which are spaced apart to embrace the bracket 5 and the roll 18 and to permit the passage therebetween of the straight end portion of the coil spring 13. 19 is a link having the upwardly extending side portions 20 at one end between which the other straight end portion of the coil spring 13 extends. These side portions are pivoted at their upper ends to the other bracket 5. The link 19 also has the U-shaped body portion 21 which extends parallel to the coil spring 13 and the support 6 and embraces the coil spring, this body portion terminating in the side portions 22 which embrace the lever 17 and are pivotally connected thereto intermediate its upper and lower ends. 23 is a cam secured upon the shaft 24 which is journalled in the backing plate 7, this cam being engageable with the abutment member or roll 18 and being adapted through this abutment member or roll to swing the lever 17 in a counter clockwise direction to thereby through the lever 17 and link 19 separate the ends of the brake friction means. To serve in locating the lower end of the lever 17, its side plates 17' are each provided with the lateral projections 17² which embrace the cam 23 at all times.

The shaft 24 is adapted to be actuated by the lever 25 which is connected in any usual manner to the brake hand lever. This lever 25 is channel-shaped and has its side flanges extending beyond the ends of its base to form the furcations 26 at one end which are sleeved upon the shaft 24 and the furcations 27 at the other end which are adapted to be pivotally connected to the rod of the connection between the lever 25 and the hand lever. The furcations 26 embrace the lever 28 which has its hub fixedly secured to the shaft 24 as by means of the pin 29 and which has its arm extending over the base of the lever 25. 30 is a set screw threadedly engaging the arm of the lever 28 and adapted to abut the base of the lever 25, this set screw being adjustable and serving upon swinging of the lever 25 in the direction indicated by the arrow in Figure 4 to swing the lever 28. For returning the lever and the cam 23 to their normal off positions upon return swinging of the lever 25, I have provided the spring 31 which has its intermediate portion 32 looped around the hub of the lever 28 and its end portions 33 and 34, respectively, looped around the set screw 30 adjacent its head and contacting with the base of the lever 25, this spring serving to maintain the set screw 30 against the base of the lever 25.

What I claim as my invention is:

1. Brake mechanism, comprising a brake drum, brake friction means within and engageable with said drum and having separate end portions, a coil spring extending between said end portions for normally urging the same toward each other, a lever pivoted to one of said end portions, a link pivoted to the other of said end portions and to said lever intermediate its ends, said link extending substantially parallel to said coil spring, an abutment on the free end of the first lever and cam means engageable with the abutment for swinging said lever.

2. Brake mechanism, comprising a brake drum, brake friction means within and engageable with said drum and having separate end portions, means for spreading said end portions apart, a coil spring extending between said end portions for normally urging the same toward each other and auxiliary means for spreading said end portions apart comprising members pivoted to said end portions and each other, one of said members extending substantially parallel to and embracing said coil spring, and a cam for actuating the other of said members.

3. Brake mechanism, comprising a brake drum, brake friction means within and engageable with said drum and having separate end portions, means comprising opposed plungers for spreading said end portions apart, a coil spring extending between said end portions for normally urging the same toward each other, a lever pivoted to one of said end portions and through which said coil spring extends, an abutment member upon said lever, a cam engageable with said abutment member, a link pivoted to the other of said end portions and through which said coil spring extends, said link being U-shaped and extending longitudinally of and embracing said coil spring and being pivoted to said lever intermediate its pivot and said abutment member.

4. Brake mechanism, comprising a brake drum, brake friction means within and engageable with said drum and having separate end portions, means for spreading said end portions apart comprising members pivoted to said end portions and each other, an abutment upon one of said members, a cam engageable with said abutment to actuate said members, and means upon said member carrying said abutment for embracing said cam.

5. Brake mechanism, comprising a brake drum, brake friction means within and engageable with said drum, a backing plate, and means upon said backing plate for actuating said brake friction means, said actuating means comprising a shaft, a lever secured to said shaft at the outer side of said backing plate, a second lever journaled upon said shaft and embracing said first mentioned lever, adjustable means upon one of said levers and adapted to abut the other of said levers for actuating said first mentioned lever from said second lever upon swinging of said second lever in one direction, and a spring for yieldably compelling said levers to move together upon swinging of said second lever in the opposite direction.

6. Brake mechanism, comprising a brake drum, brake friction means within and engageable with said drum, a backing plate, and means mounted upon said backing plate for actuating said brake friction means, said actuating means comprising a shaft journaled upon said backing plate, a lever secured to said shaft at the outer side of said backing plate, a channel-shaped lever embracing said first mentioned lever and journaled upon said shaft, a set screw threadedly engaging said first mentioned lever and adapted to abut the base of said channel-shaped lever, and a spring having one end secured to said set screw and the other end abutting the base of said channel-shaped lever.

7. Brake mechanism, comprising a brake drum, brake friction means within and engageable with said drum, a backing plate, and means upon said backing plate for actuating said brake friction means, said actuating means comprising a shaft, a lever secured to said shaft, a second lever journaled upon said shaft and extending over said first mentioned lever, means upon one of said levers and adapted to abut the other of said levers for actuating one lever from the other upon swinging of the other in one direction, and spring for yieldably compelling said levers to move together upon swinging thereof in the opposite direction.

GEORGE JOSEPH THOMAS.